Patented May 25, 1937

2,081,547

UNITED STATES PATENT OFFICE 2,081,547

THERAPEUTIC AGENT

Albert O. Mattheus, Detroit, Mich., assignor to Parke, Davis & Company, Detroit, Mich., a corporation of Michigan No Drawing. Application February 14, 1934, Serial No. 711,277

9 Claims. (Cl. 167—68)

This invention relates to iron citrate compositions and solutions in which the iron is present in a comparatively stable condition especially suitable for administration to humans and animals.

Prior to my invention certain iron citrate compositions were known and used therapeutically, the most common of which was iron ammonium citrate made by adding the ammonium ion to an iron and citric acid complex.

The previously known iron citrate compositions have at times been unsatisfactory for use in treating the human organism because of local irritation and pronounced systemic reaction following hypodermic injection, and marked continued disturbance of the stomach following a continued oral administration. They have also been undesirable because of the readiness with which decomposition may occur in pharmaceutical mixtures.

The primary object of this invention is to produce a new iron citrate composition avoiding the disadvantages above set forth and possessing characteristics and properties desirable for administration to humans.

Another object of the invention is to make available for therapeutic use a product having antianemic properties and which when administered orally or hypodermically is non-irritating and does not produce systemic reaction.

A further object is to make available for therapeutic use an iron citrate composition substantially free from acidic properties.

Another object is to obtain a form of iron which is sufficiently stable to use with other substances to give iron-containing compositions as stable as those heretofore known yet therapeutically tolerated in much larger quantities.

These and other objects are attained as hereinafter more specifically set forth.

My invention contemplates certain new chemical compositions and certain new therapeutic agents. The new products coming within the purview of the invention may be described as derivatives of ferri citric acid and an alkali metal compound sufficiently free from acidic properties to eliminate disadvantages of the prior art products.

In preparing the new products, it is preferable to first obtain ferri citric acid by dissolving ferric hydroxide in citric acid. The ferri citric acid is then reacted with a sufficient quantity of a suitable alkaline metal base to produce solutions having the desired degree of freedom from acidic properties. These solutions are then evaporated to obtain new solid products of great utility, especially for pharmaceutical preparations.

In carrying out my invention, I take freshly precipitated and thoroughly washed ferric hydroxide and react it with citric acid to obtain a clear solution of ferric citric acid. The amount of iron in this solution is determined by assay and then an alkali metal compound capable of neutralizing, partially or completely, the acidic hydrogen atoms of the ferric citric acid is added. Such compounds as sodium or potassium hydroxide, sodium carbonate or bicarbonate, sodium glycerophosphate, and other suitable basic compounds can be used in amount required theoretically to form any particular salt or mixture of salts having present a higher proportion of alkali metal than is called for by the formula

$M_3Fe_2(C_6H_4O_7)_3.H_3$ where M stands for alkali metal such as sodium, potassium or lithium.

The invention is not limited to quantities theoretically necessary to form compounds of definite molecular composition, but includes in its broader phases any product between the limits of that formed by adding alkali metal base in amount necessary to form, for example

$Na_3Fe_2(C_6H_4O_7)_3.H_3$, and that formed by adding base in amount only slightly higher than needed to form

$Na_6Fe_2(C_6H_4O_7)_3$.

In other words, the invention includes any such composition, whether a mixture or definite compound, aqueous solutions of which have a pH within the range of substantially 4 to 7.5. My preferred compositions are those whose solutions are substantially neutral, or have a pH of substantially 7.0. Such compositions are those obtained by adding an amount of base which will give a product having a proportion of alkali metal as called for by the formula

$M_6Fe_2(C_6H_4O_7)_3$.

A solution of such a composition, for example that corresponding to

$Na_6Fe_2(C_6H_4O_7)_3$, is thus obtained, which may be evaporated to give a solid product capable of storage without undergoing undesired decomposition. The generally used ammonium compounds of iron with citric acid decompose to a certain extent when stored.

In order to illustrate the preparation of the compound of my invention, the following details are given although it is to be understood that the invention in its broader aspects is not limited to these specific details.

A ferric chloride solution is made up to contain 200 grams FeCl₃ (U. S. P.) in 1000 cc. water.

200 cc. FeCl₃ solution is diluted to 1500 cc. and treated with sufficient excess of dilute (e. g. 10%) NH₄OH or NaHCO₃ to precipitate the iron. The precipitated Fe(OH)₃ is thoroughly washed by decantation, then removed by filtration and washed on a filter paper several times with water. About 15.3 grams Fe(OH)₃ should be obtained.

45.1 grams citric acid (U. S. P.) is dissolved in 50 cc. water and added to the 15.3 grams of Fe(OH)₃. The ferric hydroxide-citric acid mixture is heated on a water bath to about 90° C. to hasten solution of the ferric hydroxide-citric acid mixture. The ferric hydroxide-citric acid mixture can also be allowed to stand overnight in a warm place, about 50° C. to accomplish the same result. The clear blood red solution is made up to a volume of 300 cc. and then assayed for iron. On the basis of the iron assay citric acid is added, if necessary, in order to satisfy the stoichiometric condition involved in the following equation.

$$2Fe(OH)_3 + 3C_6H_5O_7H_3 \rightarrow Fe_2(C_6H_4O_7)_3H_6 + 6H_2O$$

The ferri citric acid solution obtained as given above is now reacted with the alkali in order to obtain the desired sodium salt of ferri citric acid. This is carried out by first computing the amount of sodium hydroxide or equivalent alkaline solution necessary to give the desired sodium salt utilizing the empirical formula for ferri citric acid $$Fe_2(C_6H_4O_7)_3H_6.$$

Having determined the quantity of alkaline solution to be used, this amount is added in portions to the ferri citric acid. The acid gradually changes in color from a blood-red to a light green as the addition of alkaline solution progresses. Preferably sodium bicarbonate is the alkaline solution used. Where it is desired to prepare the hexa sodium salt of ferric citric acid, which is one of the preferred compositions of my invention, enough sodium bicarbonate solution is added to form a compound corresponding to the formula $$Na_6Fe_2(C_6H_4O_7)_3.$$

The solution is then filtered and may be used as such or evaporated in a vacuum at a temperature of about 40° C. until a solid product is obtained in the form of brittle amorphous scales of a greenish brown color. Depending on the rate of evaporation, the solid hexa sodium salt may vary slightly in color from a greenish brown to a brownish green. Longer evaporation tends to increase the brownish color.

The penta and tetra sodium salts may be made by the same general procedure as given for the hexa sodium salt except that the amount of the sodium bicarbonate or other alkaline substance added is based on the formulas $$Na_5Fe_2(C_6H_4O_7)_3.H \text{ and } Na_4Fe_2(C_6H_4O_7)_3.H_2$$

respectively. Aqueous solutions of the tetra, penta and hexa sodium salts of ferric citric acid have been found to have pH values of 4.10, 5.45 and 6.59 respectively, while solutions of the corresponding potassium salts have pH values of 4.18, 5.66 and 6.91 respectively. These values are obtained electrometrically by using a quinhydrone electrode.

The preparation of any of the new alkali metal salts of ferri citric acid can be carried out, using the above method, by adding exactly the amount of alkali substance needed according to the formula. The invention includes compositions in which more than 3 up to slightly more than 6 equivalents of alkali metal for each mole of ferri citric acid are present. Compositions falling within the purview of the invention may be either mixtures or definite compounds, such as the solid or dissolved form of the hexa sodium salt of ferri citric acid, or a mixture of substances equivalent to such mixtures or definite compounds, and wherein ferri citric acid is present with sufficient alkali metal compound to neutralize more than three up to slightly more than six of the acidic hydrogen atoms of the ferri citric acid. My new compositions and their solutions are far superior to the iron ammonium citrate compounds now used so extensively in medicine wherever a soluble iron compound is desired for treatment, especially because it has been found that they may be administered hypodermically and orally with no deleterious effect upon the human organism. My new iron compositions have been administered orally to patients suffering from anemia with beneficial results including the increase in the number of red blood cells. The administration has resulted in no discomfiture or undesirable organic reaction.

I have further found that my new products may be incorporated with other medicinally active principles to produce preparations especially suitable for treating the human organism.

What I claim as my invention is:
1. A therapeutic agent having in the form of its aqueous solution a pH value more than 4 and having the formula $M_xFe_2(C_6H_4O_7)_3H_y$ where M is an alkali metal, $x$ is more than 3 and $x+y=6$.
2. A therapeutic agent having in the form of its aqueous solution a pH value more than 4 and having the formula $Na_xFe_2(C_6H_4O_7)_3H_y$ where $x$ is more than 3 and $x+y=6$.
3. The compound $Na_4Fe_2(C_6H_4O_7)_3H_2$, a greenish brown to brownish green amorphous solid soluble in water to form a solution having a pH value of approximately 4.10.
4. The compound $Na_5Fe_2(C_6H_4O_7)_3H$, a greenish brown to brownish green amorphous solid soluble in water to form a solution having a pH value of approximately 5.45.
5. The compound $Na_6Fe_2(C_6H_4O_7)_3$, a greenish brown to brownish green amorphous solid soluble in water to form a solution having a pH value of approximately 6.59.
6. A sodium salt of ferri citric acid in which more than three of the acidic hydrogen atoms of the ferri citric acid are replaced by sodium, said ferri citric acid having a ratio of ferric iron to citric acid radical of 2 to 3.
7. The hexa sodium salt of ferri citric acid, said ferri citric acid having a ratio of ferric iron to citric acid radical of 2 to 3.
8. The compound $M_6Fe_2(C_6H_4O_7)_3$, a greenish brown to brownish green amorphous solid soluble in water to form a substantially neutral solution, where M is an alkali metal of the class consisting of sodium and potassium.
9. A therapeutic combination of ferri citric acid with sufficient basic alkali metal compound to neutralize more than 3 up to slightly more than 6 of the acidic hydrogen atoms of the ferri citric acid, said ferri citric acid having a ratio of ferric iron to citric acid radical of 2 to 3.

ALBERT O. MATTHEUS.